(12) United States Patent
Korzin et al.

(10) Patent No.: US 8,594,885 B2
(45) Date of Patent: Nov. 26, 2013

(54) DEVICE FOR FITTING A MULTIMEDIA SYSTEM IN A VEHICLE

(75) Inventors: Stephane Korzin, Magny les Hameaux (FR); Murielle Ortis-Chartier, Gif sur Yvette (FR)

(73) Assignee: Renault S.A.S., Boulogne-Billancourt (FR)

( * ) Notice: Subject to any disclaimer, the term of this patent is extended or adjusted under 35 U.S.C. 154(b) by 196 days.

(21) Appl. No.: 12/675,606

(22) PCT Filed: Sep. 1, 2008

(86) PCT No.: PCT/FR2008/051553
§ 371 (c)(1),
(2), (4) Date: May 26, 2010

(87) PCT Pub. No.: WO2009/044026
PCT Pub. Date: Apr. 9, 2009

(65) Prior Publication Data
US 2010/0250063 A1 Sep. 30, 2010

(30) Foreign Application Priority Data
Aug. 31, 2007 (FR) ...................... 07 57303

(51) Int. Cl.
*B60R 16/023* (2006.01)
*H04L 12/66* (2006.01)

(52) U.S. Cl.
USPC ............................................. 701/36; 709/249

(58) Field of Classification Search
USPC ............................................. 701/36; 709/249
See application file for complete search history.

(56) References Cited

U.S. PATENT DOCUMENTS

| 6,141,710 | A | * | 10/2000 | Miesterfeld | 710/100 |
|---|---|---|---|---|---|
| 6,920,380 | B2 | * | 7/2005 | McClure et al. | 701/1 |
| 7,860,619 | B2 | * | 12/2010 | Bertosa et al. | 701/31.4 |
| 2003/0167345 | A1 | * | 9/2003 | Knight et al. | 709/249 |
| 2004/0092253 | A1 | | 5/2004 | Simonds et al. | |
| 2005/0239434 | A1 | * | 10/2005 | Marlowe | 455/345 |
| 2006/0093155 | A1 | * | 5/2006 | Fiori et al. | 381/86 |

FOREIGN PATENT DOCUMENTS

| DE | 102004061660 B3 | * | 2/2006 | | |
|---|---|---|---|---|---|
| DE | 102005035843 A1 | * | 2/2007 | | |
| FR | 2864652 A1 | * | 7/2005 | | G06F 9/455 |
| JP | 09091175 A | * | 4/1997 | | G06F 11/34 |
| JP | 11-008647 | | 1/1999 | | |
| JP | 2002-152244 | | 5/2002 | | |

(Continued)

OTHER PUBLICATIONS

EPO Machine Translation of FR 2864652.*

(Continued)

*Primary Examiner* — James Trammell
*Assistant Examiner* — David Testardi
(74) *Attorney, Agent, or Firm* — Oblon, Spivak, McClelland, Maier & Neustadt, L.L.P.

(57) ABSTRACT

An adapter device for fitting in a vehicle between a vehicle computer and a computer of a second element integrated in the vehicle for exchanging information between the above. The device includes a first vehicle interface connected to a dedicated vehicle line and a second vehicle interface, connected to a vehicle network and a first second element interface connected to a second element network and a second second element interface connected to a dedicated second element line.

9 Claims, 2 Drawing Sheets

(56) References Cited

FOREIGN PATENT DOCUMENTS

| JP | 2003-137044 | | 5/2003 | | |
|---|---|---|---|---|---|
| JP | 2003137044 | A * | 5/2003 | ............. | B60R 16/02 |
| JP | 2003309584 | A * | 10/2003 | ............. | H04L 12/46 |
| JP | 2003309586 | A * | 10/2003 | ............. | H04L 12/46 |
| JP | 2006270878 | A * | 10/2006 | | |
| JP | 2007145182 | A * | 6/2007 | | |
| KR | 1020070027324 | * | 3/2007 | | |

OTHER PUBLICATIONS

JPO Machine Translation of JP 09-91175.*
KIPO machine translation of KR 2007-0027324.*
Translation of FR 2864652.*
JPO machine translation of JP 2003-137044 A.*
JPO machine translation of JP 2003-309584 (original JP document published Oct. 31, 2003).*
EPO Machine Translation of FR 2864652 (original FR document published Jul. 1, 2005).*
JPO Machine Translation of JP 09-91175 (original JP document published Apr. 4, 1997).*
KIPO machine translation of KR 2007-0027324 (original KR document published Mar. 9, 2007).*
Translation of FR 2864652 (original FR document published Jul. 1, 2005).*
JPO machine translation of JP 2003-137044 A (original JP document published May 14, 2003).*
Office Action dated Aug. 7, 2012, in Japanese Patent Application No. 2010-522425 (with English-language Translation).

* cited by examiner

DEVICE FOR FITTING A MULTIMEDIA SYSTEM IN A VEHICLE

BACKGROUND

The invention relates to the field of information exchange in a motor vehicle and more particularly to an adaptation device making it possible to facilitate information exchange between a vehicle and an element integrated into the vehicle such as a multimedia system.

A motor vehicle is generally designed for an average duration of five to seven years and integrates several electronic systems. A multimedia system has a shorter lifetime than that of a vehicle, generally from two to three years before being replaced. Given the constant upgrading of the electronics market and technological innovations, it seems natural to integrate the new facilities arriving on the market into vehicles. Moreover, when a new multimedia system is developed, it is intended to be integrated into a large number of models of vehicles, whose electronic architectures, designed at different epochs and with different constraints, may vary.

The protocols used to exchange data or information between the various multimedia systems and the vehicle are generally determined for a given vehicle range. These data originate from various sensors or computers and relate for example to the state of the vehicle or of systems integrated into the vehicle. Gateways can be used to communicate between onboard networks of different technologies. Thus initially, various data travel to a gateway for example via the CAN bus of the vehicle. These data are thereafter translated by way of conversion functions integrated into the gateway and are dispatched via the CAN bus of the vehicle, or any other network, to the various systems for which the information is relevant, in the suitably adapted format.

The conversion and the transmissions of data are carried out for a given vehicle, and for a given system. To integrate a new multimedia system arriving on the market into a vehicle which is for example already on the market, it is sometimes not sufficient to modify the conversion function stored in the adaptation device or gateway. Indeed, the integration of new multimedia facilities into an existing vehicle may require that the vehicle make available information not demanded by the existing multimedia facilities or that the new multimedia system make available information in a previous format. From one vehicle to another or from one multimedia system to another, this information may flow around onboard networks in various formats or travel over dedicated wires also in various formats. Poorly controlled, the adaptations required by this integration may impact a large number of computers, both of the vehicle and of the multimedia system, and are expensive. Moreover, standardizing the interface between all the vehicles and all the multimedia systems does not make it possible to manage independent upgrades of the format and of the content of the information of the vehicles on the one hand and of the format and of the content of the information of the multimedia systems on the other hand.

BRIEF SUMMARY

In order to alleviate these drawbacks, an aim of the invention is to propose a device making it possible to isolate the vehicle world and the multimedia world from one another, and to manage the adaptation of a new multimedia system on a range of different vehicles by way of a single component. With this aim, the subject of the invention is an adaptation device intended to be fitted in a vehicle between a computer of the vehicle and a computer of a second element integrated into said vehicle so as to exchange information between themselves, characterized in that the device comprises a first vehicle interface means connected to a dedicated wire of the vehicle and a second vehicle interface means connected to a network of the vehicle, and in that it comprises a first second-element interface means connected to a network of the second element and a second second-element interface means connected to a dedicated wire of the second element.

Such a device allows a vehicle and a multimedia system to be upgraded independently of one another. Thus, when a vehicle is mass produced from a certain time, the appearance of a new multimedia system may advantageously be integrated into a defined, mass-produced vehicle without reassessing the electrical or electronic architecture of this vehicle.

Such a device makes it possible to exchange information flowing not only over a network but also information flowing over dedicated wires. For example it makes it possible to transform information flowing over the CAN bus of the vehicle into wired information and vice versa.

This device makes it possible to concentrate on a single component the requirements of information exchanges from one world to another and the translation of the format and of the content of this information. Such a device can acquire information arising from networks, for example of CAN, Flexray, LIN, MOST, IEEE1394 type, or from wired inputs, such as for example the voltage level, the current level, a PWM signal, according to the modalities specific to each type of information and medium. It performs the conversion of a format and of a content to another format and another content, and then retransmits the information converted over networks or wired outputs, according to the modalities specific to each type of information and medium. Such a device can be made to store the value of each piece of information received or converted, for example to alleviate defects in the information acquisition chain or adapt the modalities of reception and transmission of a piece of information of an input or of a network to an output or another network.

Such a device can form the subject of a dedicated component whose adaptation function varies as a function of the combination (vehicle, multimedia system), be integrated into a multimedia component whose conversion function and vehicle interface varies from one vehicle to another or be integrated into a vehicle component whose conversion function and multimedia interface varies from one multimedia system to another.

According to other characteristics, the device can comprise a conversion means for converting an information format of the vehicle into an information format of the second element and vice versa, and an information storage means for storing information emitted by the computer of the vehicle and the computer of the second element.

The invention also relates to a method implemented by the device as claimed in one of the preceding claims, characterized in that it comprises a step in the course of which a format of information flowing over a network of the vehicle is translated, by way of an information format conversion means, into a format of information flowing over a dedicated wire of the second element and vice versa.

According to other characteristics, the method can comprise a step in the course of which a format of information flowing over a network of the vehicle is translated, by way of an information format conversion means, into a format of information flowing over a network of the second element, and vice versa, the method can comprise a step in the course of which a format of information flowing over a dedicated wire of the vehicle is translated, by way of an information format conversion means, into a format of information flowing over a dedicated wire of the second element, and vice versa.

The invention also relates to a motor vehicle comprising such an adaptation device.

The invention also relates to a use of one or more adaptation devices to integrate a multimedia system into a vehicle The device can be used to integrate one or more existing multimedia systems into a new vehicle.

BRIEF DESCRIPTION OF THE DRAWINGS

The invention will be better understood through the description hereinafter of an embodiment given by way of nonlimiting example with reference to the appended drawings, in which.

DETAILED DESCRIPTION

Figure 1:
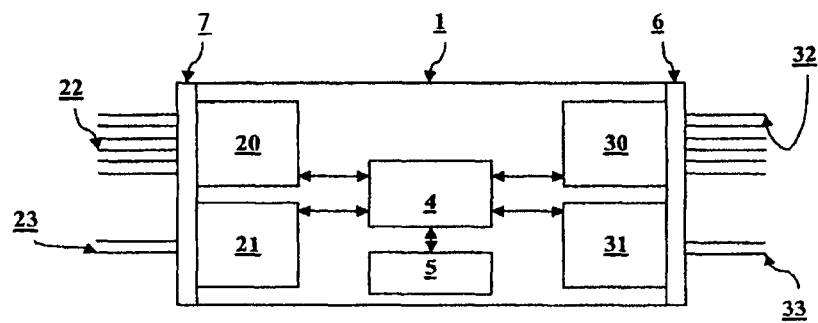
FIG. 1 represents an adaptation device according to the invention.

Represented in FIG. 1 is the functional diagram of a device 1 allowing a given vehicle (not represented) to adapt to technological upgrades in elements to be integrated into the vehicle, for example multimedia systems and conversely allowing these elements to adapt to the upgrades of a vehicle.

The device 1 is fitted between a vehicle computer and for example a multimedia system computer.

This adaptation device 1 is intended to serve as multimedia and/or vehicle upgrade interface. When a multimedia system has for example to be fitted to different vehicles of a range, it is not necessary to redevelop an electrical architecture for each vehicle. The adaptation device 1 forms the link between the vehicle and the multimedia system.

The adaptation device 1, or gateway 1 allows information exchange between the vehicle and a multimedia system (not represented) integrated into the vehicle.

The gateway 1 comprises interface means: a multimedia interface allowing communication and exchange of data between the computer or computers of the multimedia system and the gateway on the one hand, and a vehicle interface allowing communication and exchange of data between the vehicle and the gateway 1 on the other hand. It will be understood that the multimedia system can comprise one or more elements.

The vehicle interface comprises, more precisely, first vehicle interface means 20 which are vehicle input/output interfaces 20 connected to wired links or dedicated wires 22 of the vehicle—that is to say a wire where only one piece of information flows—and second vehicle interface means 21 which are vehicle network interfaces 21 connected to one or more networks 23 of the vehicle such as the vehicle's CAN network.

Likewise, the multimedia interface comprises first multimedia interface means 30 which are multimedia input/output interfaces 30 connected to wired links or dedicated wires 32 of the multimedia system and second multimedia interface means 31 which are second multimedia network interfaces 31 connected to one or more networks 33 of the multimedia system, for example to the multimedia's CAN network.

It will be understood that these examples of CAN networks are given by way of nonlimiting example. There may be as many adaptation devices 1 or gateways 1 as networks and dedicated wires necessary for information exchange that are used, or a single adaptation device comprising as many network interfaces and input/output interfaces as there are networks and dedicated wires necessary for information exchange that are used between the (computer of the) vehicle and the (computer of the) multimedia system.

The gateway 1 comprises connectors 7 and 6 able to link on the one hand the vehicle input/output interfaces 20 and the multimedia input/output interfaces 30 respectively to the wired links of the vehicle 22 and of the multimedia system 31, and to link on the other hand the vehicle network interfaces 21 and the multimedia network interfaces 32 respectively to the networks of the vehicle 23 and of the multimedia system 33. Thus, the wired links 22 of the vehicle are not connected directly to the multimedia system but to the gateway 1 and more particularly to the vehicle input/output interface 20. The wired links arising from the multimedia system are not connected directly to the computers of the vehicle but to the gateway 1, and more precisely to the multimedia input/output interface 30. The CAN network of the vehicle for example is not hooked up directly to the computers of the multimedia system but to the gateway 1 by way of the vehicle CAN interface. Likewise, the multimedia computers are hooked up to a second CAN network connected to the gateway 1 by way of a multimedia CAN interface.

The gateway 1 comprises means for processing 4 and for storing 5 information. A means for processing the data or information, for example a microcontroller 4, is intended to communicate with the various interfaces, vehicle and multimedia, through which the vehicle and multimedia data travel. Unlike a computer which will search for the information it needs on a network, the gateway 1 is able to recover all the data that the vehicle and the multimedia system are capable of providing, and which the vehicle or multimedia system needs. It thus makes it possible to centralize all the data required for vehicle communication with the multimedia system. All the required data are stored in memory so that the gateway 1 can dispatch it to the vehicle or to the multimedia system. For this purpose, the microcontroller 4 receives data originating from the computers of the vehicle or multimedia computers by way of the vehicle interface and multimedia interface, and dispatches these data to the storage means 5. The data stored in the storage means 5 are converted into the data format adapted to the vehicle or to the multimedia system.

The gateway 1 allows fast and cheaper deployment of a new multimedia system or a new range of multimedia systems on new vehicles and existing vehicles of different generations, by concentrating all the necessary adaptations into a single component. When a new multimedia system has for example to be integrated into a large number of vehicle models, new or already in mass production, of one and the same range or of different ranges, the gateway 1 is deployed on each vehicle model with a vehicle interface and an adapted conversion function. The multimedia interface, the format and the content of the information on the multimedia side are identical from one vehicle model to another, and the other components of the multimedia system are then compatible with all the vehicles without modification. When a new vehicle has to receive various multimedia systems, the gateway 1 is for example deployed on each multimedia system with a multimedia interface and an adapted conversion function. The vehicle interface, the format and the content of the information vehicle side are identical from one multimedia system to another, and the other components of the vehicle are then compatible with all the multimedia systems without modification. The invention advantageously makes it possible not to reassess the whole of the electrical architecture of the vehicle when one or a whole range of multimedias has to be changed and replaced with a new generation of multimedia systems.

Figure 2:
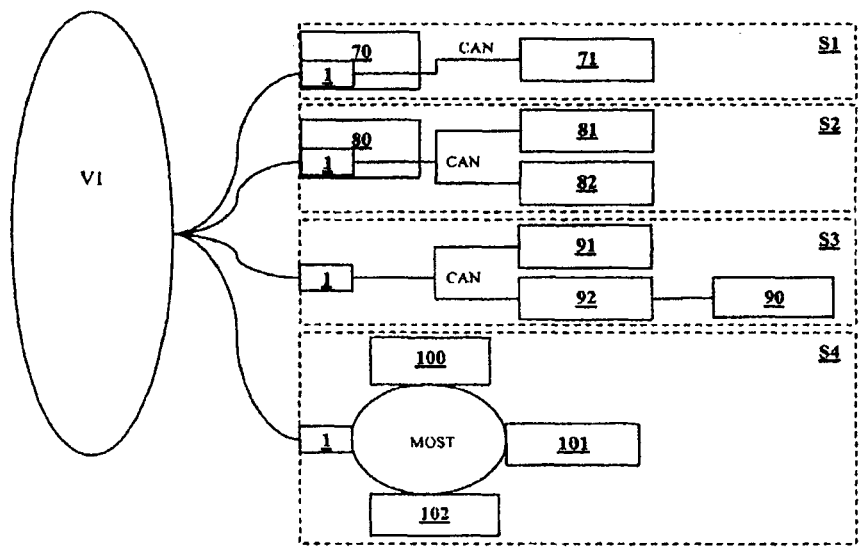
FIG. 2 represents a set of multimedia systems integrated into a given vehicle model.
Figure 3:
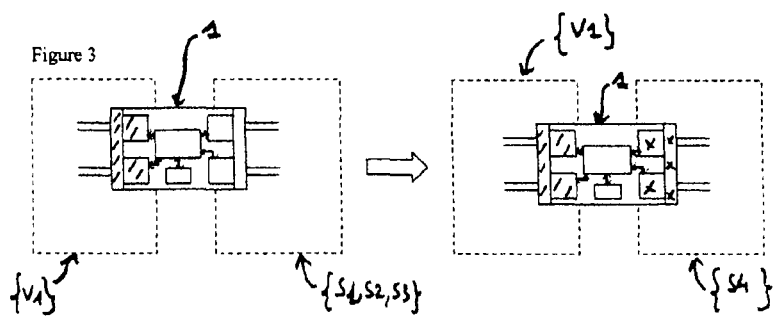
FIG. 3 represents the adaptation device implemented for adding new multimedia systems (S3, S4) into a vehicle V1.

Represented in FIG. 2 is an example of an adaptation interface standardized on a vehicle V1 with three multimedia systems S1, S2, S3 and an adapted gateway 1. In this example, the multimedia system S1 comprises a display 70 and a radio 71, the multimedia system S2 comprises a radio 80, a radio 81 and a navigation system 82, the multimedia system S3 comprises a display 90, a radio 91, a navigation system 92. The gateway 1 may or may not be integrated into an element of the multimedia system. When a new multimedia system S4 comprising for example a radio 100, a radio 101 and a navigation system 102, is added to this vehicle V1, the interface standard of the vehicle V1 may optionally be supplemented for the needs of the new multimedia system S4. However, the implementation of the supplement impacts only the implementation of the gateway 1 for the multimedia system S4, and impacts neither the vehicle V1, nor the other multimedia systems S1, S2 and S3, nor even the other components of the multimedia system S4. The gateway 1 of the multimedia system S4 uses all the information of the standardized interface of the vehicle V1 which is useful to it and which may originate from the other multimedia systems S1, S2, S3. The example of FIG. 2 is also illustrated in FIG. 3 where an interface integration on the same vehicle V1 has been represented. The gateway 1 is standardized on the vehicle V1 side and is adapted on the multimedia side to the multimedia interface standard of the multimedia system S4. The multimedia system S4 implements a specific multimedia interface and a specific conversion function.

Figure 4:
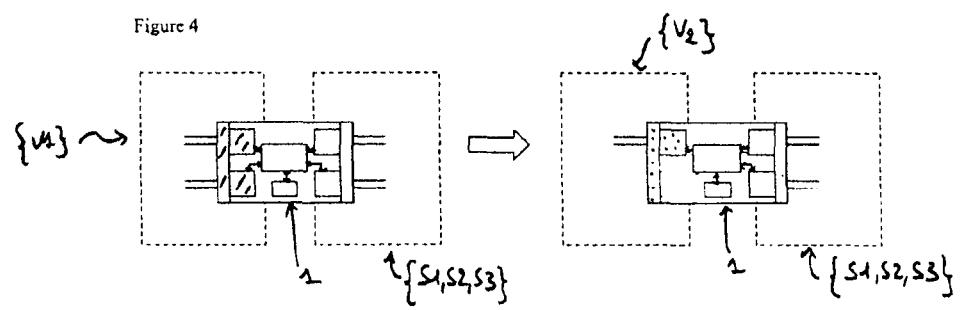
FIG. 4 represents the adaptation device implemented for integrating multimedia systems (S1, S2, S3) of a vehicle V1 into a vehicle V2

The integration of the same multimedia systems S1, S2 and S3 present on the vehicle V1 onto another vehicle V2 not having the same architecture as the vehicle V1 is represented in FIG. 4 where the vehicle V2 defines a specific interface standard. The gateway 1 then implements a specific vehicle interface and a specific conversion function of the vehicle V2 but complies with the multimedia interface standard of the systems S1, S2 and S3. In this example, the vehicle V2 has no CAN network and the gateway 1 acquires wired signals for replacing the information required.

Figure 5:
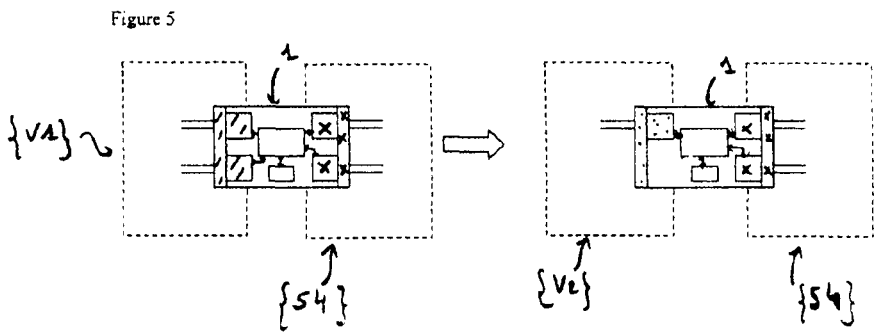
FIG. 5 represents an adaptation device implemented for integrating multimedia systems of a vehicle V1 into a vehicle V2, to which systems new multimedia systems are added.

In FIG. 5, the multimedia systems S1, S2, S3 present in the vehicle V1 are integrated into the vehicle V2. The new multimedia system S4 is also integrated into this vehicle V2. The gateway 1 acquires wired signals for replacing the information required for the operation of the multimedia system S4 and converts them into the same multimedia format as on the vehicle V1. The other computers, both of the vehicle V2 and of the multimedia systems S1, S2, S3 and S4, are not modified.

The gateway 1 according to the invention behaves as a computer which makes it possible to separate the vehicle world from that of a multimedia system and vice versa. The gateway 1, whether or not dedicated to a specified multimedia system, makes it possible to guarantee the ability of the two worlds, vehicle and multimedia, to be upgraded over time independently of one another. This interface component 1 can constitute a specific computer, but can also be integrated with existing computer. Another advantage of such an invention is the concentration of the adaptations to be managed into a single computer. This advantage is therefore at one and the same time of an economic nature and of the nature of functional optimization, thus limiting the complexity of development, of upgrade and of integration.

The invention claimed is:

1. An adaptation device fitted in a vehicle, comprising:
   a microcontroller;
   a first vehicle interface unit connected to a dedicated wire of the vehicle;
   a second vehicle interface unit connected to a network of the vehicle;
   a first multimedia system interface unit connected to a dedicated wire of a multimedia system including a computer;
   a second multimedia system interface unit connected to a network of the multimedia system; and
   a converting unit configured to convert a format of information flowing over the network of the vehicle obtained from the second vehicle interface unit into a format of information flowing over the dedicated wire of the multimedia system obtained from the first multimedia system interface unit,
   wherein the adaptation device is built into and affixed to the vehicle between a vehicle computer and the computer of the multimedia system, each of which is built into and affixed to said vehicle so as to exchange information therebetween.

2. The adaptation device as claimed in claim 1, wherein the adaptation device further comprises:
   an information storage unit that stores information emitted by the vehicle computer and the multimedia system computer.

3. A motor vehicle comprising:
   a vehicle receiver/transmitter to receive and transmit information of said vehicle;
   the multimedia system;
   a multimedia receiver/transmitter to receive and transmit information of said multimedia system,
   wherein the adaptation device as claimed in claim 1 forms a gateway between the vehicle receiver/transmitter and the multimedia receiver/transmitter.

4. The adaptation device of claim 1, wherein a multimedia system is built into the vehicle by connecting the adaptation device to the multimedia system and components of the vehicle.

5. The adaptation device of claim 1, wherein the converting unit is further configured to convert the format of information flowing over the dedicated wire of the multimedia system into the format of information flowing over the network of the vehicle.

6. A method implemented by an adaptation device, comprising:
   fitting the adaptation device in a vehicle, the adaptation device including a microcontroller, a first vehicle interface unit connected to a dedicated wire of the vehicle, a second vehicle interface unit connected to a network of the vehicle, a first multimedia system interface unit connected to a dedicated wire of a multimedia system including a computer, a second multimedia system interface unit connected to a network of the multimedia system, and a converting unit;
   converting, by the converting unit, a format of information flowing over the network of the vehicle obtained from the second vehicle interface unit into a format of information flowing over the dedicated wire of the multimedia system obtained from the first multimedia system interface unit; and converting, by the converting unit, the format of information flowing over the dedicated wire of the multimedia system into the format of information flowing over the network of the vehicle, wherein the adaptation device is built into and affixed to the vehicle between a vehicle computer and the computer of the multimedia system, each of which is built into and affixed to said vehicle so as to exchange information therebetween.

7. The method as claimed in claim 6, further comprising: converting the format of information flowing over the network of the vehicle into a format of information flowing over the network of the multimedia system obtained from the second multimedia system interface unit, and converting the format of information flowing over the network of the multimedia system into the format of information flowing over the network of the vehicle.

8. The method as claimed in claim 7, wherein the first multimedia system interface unit, the second multimedia system interface unit, the first vehicle interface unit, and the second vehicle interface unit are modified during the integration of the multimedia system into the vehicle.

9. The method as claimed in claim 6, further comprising: converting a format of information flowing over the dedicated wire of the vehicle obtained from the first vehicle interface unit into the format of information flowing over the dedicated wire of the multimedia system, and converting the format of information flowing over the dedicated wire of the multimedia system into the format of information flowing over the dedicated wire of the vehicle.

\* \* \* \* \*